July 26, 1966 C. W. HORNIGOLD 3,262,185
BALL AND ROLLER BEARINGS
Filed Oct. 4, 1965 4 Sheets-Sheet 1

Inventor
CHARLES W. HORNIGOLD
By Irwin S. Thompson
Attorney

Inventor
CHARLES W. HORNIGOLD
By Irwin S. Thompson
Attorney

July 26, 1966  C. W. HORNIGOLD  3,262,185
BALL AND ROLLER BEARINGS

Filed Oct. 4, 1965  4 Sheets-Sheet 3

Inventor
CHARLES W. HORNIGOLD
By Irwin S. Thompson
Attorney

July 26, 1966  C. W. HORNIGOLD  3,262,185
BALL AND ROLLER BEARINGS

Filed Oct. 4, 1965  4 Sheets-Sheet 4

Inventor
CHARLES W. HORNIGOLD
By Irwin S. Thompson
Attorney

United States Patent Office 3,262,185
Patented July 26, 1966

3,262,185
BALL AND ROLLER BEARINGS
Charles W. Hornigold, Norfolk, England, assignor to Cooper Roller Bearing Company Limited, Norfolk, England
Filed Oct. 4, 1965, Ser. No. 492,478
Claims priority, application Great Britain, Apr. 16, 1963, 14,832/63
11 Claims. (Cl. 29—148.4)

This invention relates to ball and roller bearings of the type known as split bearings, that is to say bearings having one or more circular races divided by planes that extend from the inside to the outside of the race so that the race consists of two or more curved parts which are clamped together to form the circular race. Each division may be in a single plane or may have some other shape, e.g. a V-shape, curved shape, or zig-zag shape,. This application forms a continuation-in-part of my pending application Number 358,889, filed on April 10, 1964.

For many years large quantities of these bearings have been made and the only satisfactory method of production of the races has been to make the curved sections separately, clamp these together by suitable jigs and fixtures at each machining operation including grinding, and separately harden by heating and cooling. This is an expensive method especially in hours of work involved and more distortion of the separate parts takes place during heat treatment especially with the larger sizes of bearings, which has to be subsequently corrected.

We have considered the possibility of welding the race parts together for the purpose of machining and heat treatment and then separating them. This did not seem to be practicable for various reasons but we have now succeeded in developing a practical process for making the race parts in this way.

According to the invention, the method of making a race part of a split ball or roller bearing, comprises shaping the race parts from high carbon steel containing chromium, clamping the race parts in juxtaposition to each other, welding the race parts together at localised positions at the annular edges thereof, machining, heat treating and grinding the race, and finally cutting out the weld metal.

In one example of the invention the method of making a race part of a ball or roller bearing comprises shaping the race parts into two part-circular parts from high carbon steel containing chromium, clamping the race parts in juxtaposition to each other to form one complete annulus cutting notches in the outside edges at the ends of the meeting surfaces of the ends of the part-circular parts, which openings do not encroach to a material extent if at all on to the race track, placing weld metal in the notches; heating the weld metal to a plastic condition and pressing the weld metal into the notches, the weld metal being steel of a lower carbon content than that of the race parts, machining, heat treating and grinding the race, and finally cutting out the weld metal, thereby separating the race parts.

In an alternative example of the invention, the method of making a race part of a ball or roller bearing comprises shaping the race parts into part-circular parts from high carbon steel containing chromium, placing the ends of a welding wire between the meeting faces of the parts adjacent the ends thereof, pressing the parts together, passing an electric current through the whole assembly which heats the ends of the welding wires and fuses the race parts to the flattened ends, the current being then switched off and the race being then machined, heat treated and ground to a finished size, and finally cutting out the weld metal to separate the parts from each other.

It is difficult to weld high carbon chromium steel at all and especially since stresses occurring during machining and heat treatment tend to cause the weld metal to break away from the race metal. This is accentuated because we do not weld across the whole of the meeting surfaces but only at the ends thereof so that only a small welding area is available. We tried welding with the same metal as the race metal but this proved unsuccessful. However, by our method we avoid metallurgical interference with the track by confining the weld to areas outside the track but the weld is found to be strong enough due to forming large enough weld areas by making openings at the ends of the meeting faces (or by placing the ends of a welding wire between the meeting faces of the parts adjacent the ends thereof) and by the use of pressure welding using a suitable weld metal without melting the race metal.

The race metal may contain 0.9 to 1.20 percent carbon, 1.0 to 1.7 percent chromium and .3 to .75 percent manganese by weight of the alloy. The weld metal may be mild steel containing 0.05 to 0.3 percent carbon.

The two halves may be produced from strip by forging and then clamped in a jig and the welding effected.

The heat treatment may be effected by heating to 800–900° C. (e.g. 820° C.), and quenching in oil.

The race parts when welded together may be machined all over, hardened by heat treatment, ground and finally separated by sawing or grinding out the small pieces of weld metal leaving the race tracks unaffected. The race parts are slightly wider than the actual ball or roller tracks and the openings remain permanently in the finished bearing.

The inner race parts may be separated by a gap of 6 to 12 thousandths of an inch at each division when welded together. The gap is required so that when the inner race track is ground to a cylindrical shape it will fit around a shaft leaving these gaps to ensure tight clamping on the shaft.

Both inner and outer races may be made in accordance with the invention. The race parts may be made with any required formations, e.g. roller locating flanges, grooves for clamping, and holes for clamping screws.

The invention is illustrated by way of examples in the accompanying diagrammatic drawings wherein.

Figure 1:
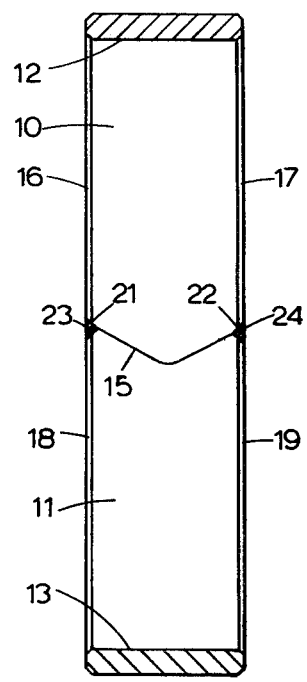
FIGURE 1 is a sectional view of an outer race of a split roller bearing.
Figure 3:
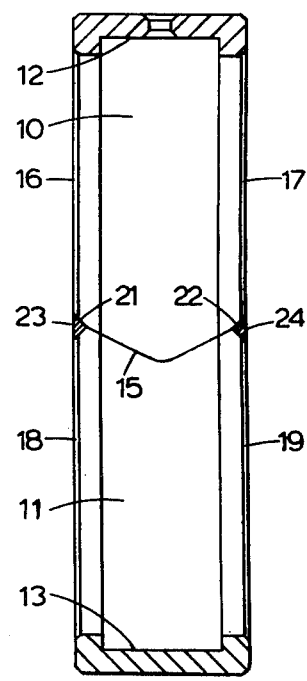
FIGURE 3 is a sectional view of the outer race of a modified form of bearing.

In FIGURES 1 and 3 the two parts of the outer race 10, 11 have roller race surfaces 12, 13 which are ground to circular shape. They have meeting surfaces at two diametrically opposite positions of division, one of which is shown at 15. The division is V-shaped and the parts are kept together at the division as shown by the single line. The race parts 10, 11 are made wider than the roller surfaces 12, 13 as shown at 16, 17 and 18, 19. At the ends of the division 15 V-shaped openings or notches 21, 22 are provided, the apices of which extend only to a negligible extent on to the surfaces 12, 13. These openings are filled with weld metal 23, 24. In this condition the race is machined and ground to very accurate dimensions and heat treated, whereupon the weld metal 23, 24 is removed from all four positions leaving the split halves of the race in finished condition.

Figure 2:
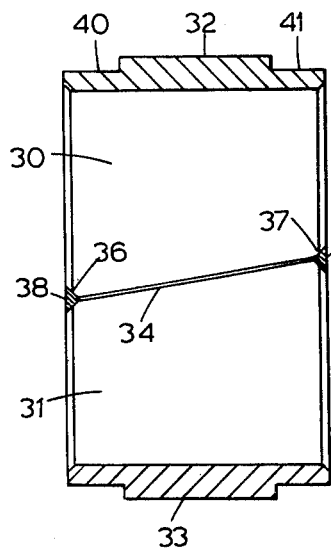
FIGURE 2 is a sectional view of the inner race of the same type of bearing.
Figure 5:
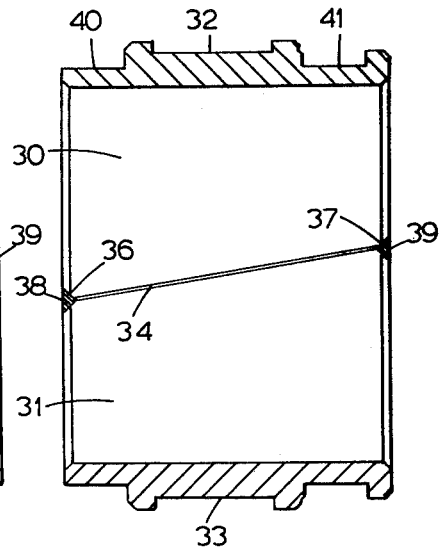
FIGURE 5 is a sectional view of the inner race of the same bearing.
Figure 6:
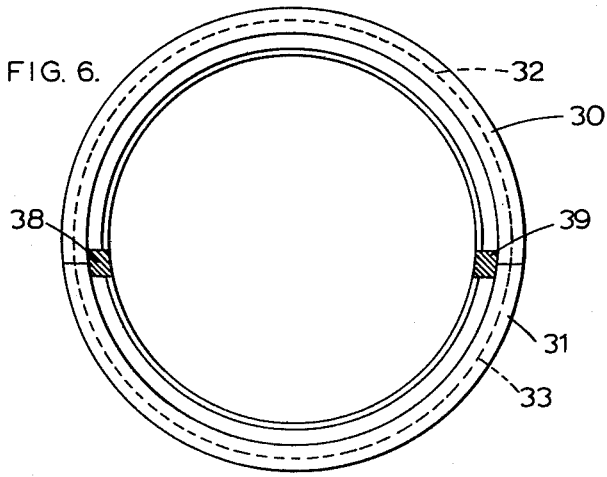
FIGURE 6 is an end view of the inner race.
Figure 4:
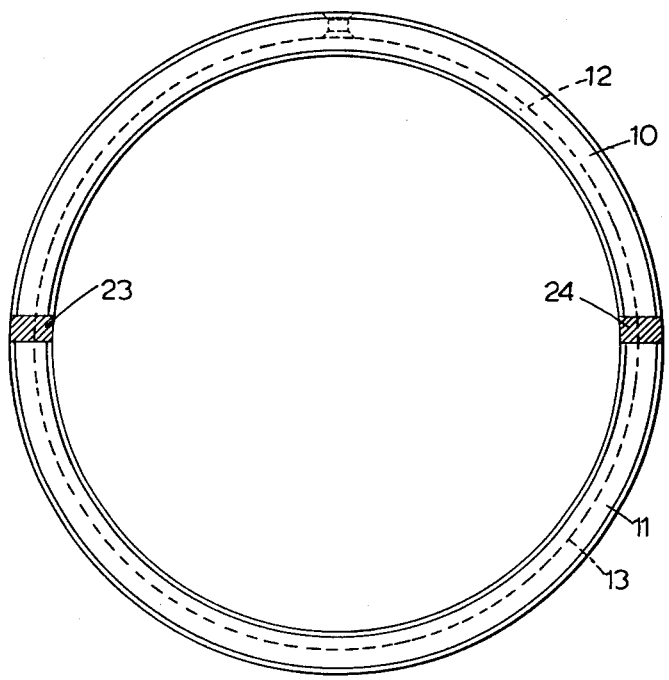
FIGURE 4 is an end elevation of the race shown in FIGURE 3.

The corresponding inner race (FIGURE 2) has two parts 30, 31 having roller race surfaces 32, 33; division 34; openings 36, 37 and weld metal 38, 39. The race parts are extended widthwise to form annular flanges 40, 41 to receive clamping rings to clamp the race on to a shaft. The openings 36, 37 are located in these flanges and do not encroach at all on the race surfaces 32.

FIGURES 3 to 6 show a modified form of bearing which is made in the same way as far as the welding is concerned.

The inner race parts are slightly spaced apart at the division 34 by 6 to 12 thousandths of an inch.

Figure 7:
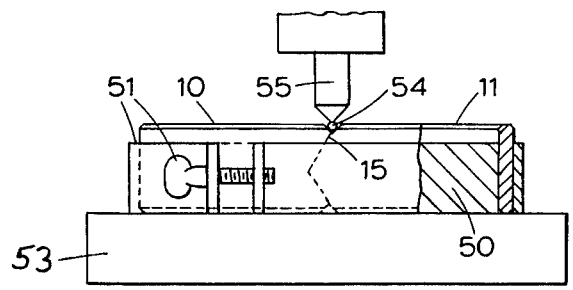
FIGURE 7 is a view showing one method of welding.

FIGURE 7 illustrates one method of welding. The race parts 10, 11 are placed on a circular former 50 which can leave the race parts spaced at 15 about 6 to 12 thousandths of an inch apart in the case of the inner races and together in the case of the outer races. The race parts 10, 11 are clamping on to the former 50 by a clamp 51. This assembly is placed on the table 53 of a pressure welding machine and a pellet 54 is placed in the opening 21. The electrode 55 is brought to bear on the pellet to heat it electrically and to press it when soft into the opening. The other three openings are treated in the same way. The race is then removed from the clamp, machined, heat treated and ground, and the weld metal finally removed.

Figure 8:
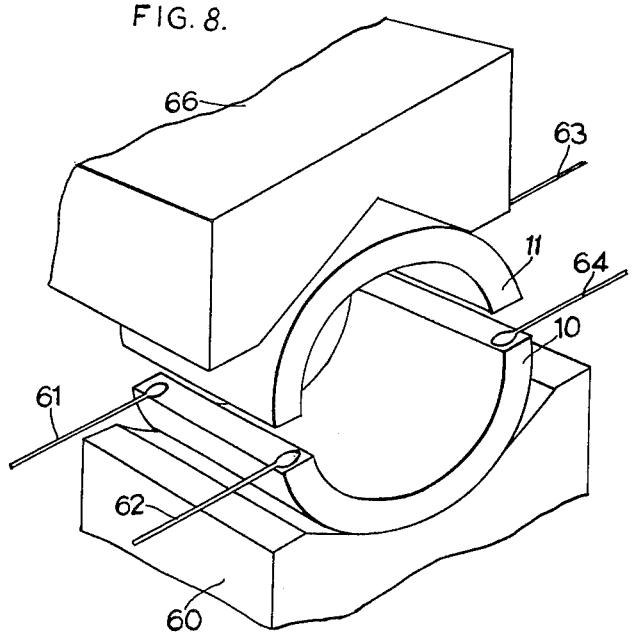
FIGURE 8 is a view showing an alternative method of welding.
Figure 9:
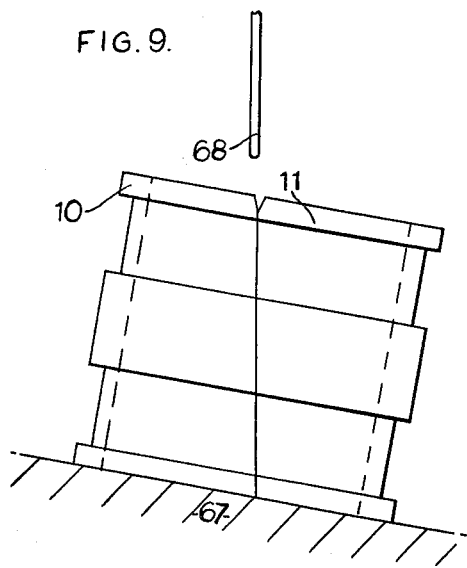
FIGURE 9 shows a method of separating the finished race parts.

FIGURE 8 illustrates an alternative method of welding the race parts 10, 11 together. The part 10 is placed in a fixed V-block 60 which is a water cooled copper block. The ends of mild steel copper-coated welding wire 61, 62, 63, 64 are placed on the edges or meeting faces of the part 10 and the upper part 11 is pressed down on these ends by an upper V-block 66 this also being a water-cooled copper block. The ends of the wire are actually inserted in the normal round form and become pressed to the shape shown. An electric current is then passed through the whole assembly which heats the ends of the wires these ends are flattened by the applied pressure and the parts 10, 11 are fused to the flattened ends. The current is then switched off and the wires sheared off. The parts 10, 11 are then machined, heat treated to harden them and ground to finished size. Then the flattened weld metal is machined out by placing the parts 10, 11 on a table 67 (FIGURE 9), which may be magnetic and the angle of which is adjustable so that the meeting faces are in line with the plane of a thin saw or grinding wheel 68 (FIGURE 9) which is advanced to remove the weld metal thereby separating the parts.

I claim:

1. A method of making a race of a split ball or roller bearing, comprising shaping the race parts from high carbon steel containing chromium, clamping the race parts in juxtaposition to each other, welding the race parts together at localized positions at the annular edges thereof, the weld not encroaching materially on the race track, machining, heat treating and grinding the race, and finally cutting out the weld metal.

2. A method of making a race of a ball or roller bearing comprising shaping the race parts into part-circular parts from high carbon steel containing chromium, placing the ends of a welding wire between the meeting faces of the parts adjacent the ends thereof, pressing the parts together, passing an electric current through the whole assembly which heats the ends of the welding wires and fuses the race parts to the flattened ends, the current being switched off and the race being then machined, heat treated and ground to a finished size, and finally cutting out the weld metal to separate the parts from each other.

3. A method of making a race of a ball or roller bearing comprising shaping the race parts into two part-circular parts from high carbon steel containing chromium, supporting one race part in a lower water cooled copper V-block, placing the ends of a mild steel copper coated welding wire on the edges or meeting faces adjacent the ends of the one race part, the other race part being pressed in juxtaposition onto the edges of the one race part by means of an upper copper water cooled V-block, passing an electric current through the whole assembly which heats the ends of the welding wires and fuses the two race parts to the flattened ends, the current being switched off and the race being then machined, heat treated and ground to a finished size, and finally cutting out the weld metal by means of a thin saw or grinding wheel thereby separating the race parts.

4. A method as claimed in claim 3 wherein the race parts are made from steel containing 0.9 to 1.10 percent carbon, 1.0 to 1.7 percent chromium, and 0.3 to 0.75 percent manganese by weight of the alloy, and the weld metal contains 0.05 to 0.3 percent carbon.

5. A method as claimed in claim 3, wherein the race parts are made slightly wider than the actual ball or roller tracks.

6. A method as claimed in claim 3, wherein the race parts constitute outer two part-circular parts and inner two part-circular parts within said outer parts and said inner race parts are separated from each other by a gap of 6 to 12 thousandths of an inch at each division when welded together, and said outer race parts are clamped together.

7. A method of making a race of a ball or roller bearing, comprising shaping the race parts into two part-circular parts from high carbon steel containing chromium, clamping the race parts in juxtaposition to each other to form one complete annulus, spot welding the parts together at the outer annular edges of the parts, machining, heat treating and grinding the race, and finally cutting out the weld metal thereby separating the race parts.

8. A method of making a race of a ball or roller bearing, comprising shaping the race parts into two part-circular parts from high carbon steel containing chromium, clamping the race parts in juxtaposition to each other to form one complete annulus, cutting notches in the outside edges at the ends of the meeting surfaces of the ends of the part circular parts, which openings do not encroach materially on to the race track, placing the weld metal in the notches, heating the weld metal to a plastic condition and passing the weld metal into the notches, the weld metal being a steel of lower carbon content than the race parts, machining, heat treating and grinding the race, and finally cutting out the weld metal thereby separating the welded parts.

9. A method as claimed in claim 8 wherein the race parts are made from steel containing 0.9 to 1.10 percent carbon, 1.0 to 1.7 percent chromium, and 0.3 to 0.75 percent manganese by weight of alloy, and the weld metal contains 0.05 to 0.3 percent carbon.

10. A method as claimed in claim 8, wherein the race parts are made slightly wider than the actual ball or roller tracks and the openings are left in the finished bearing.

11. A method as claimed in claim 8, wherein the race parts constitute outer two part-circular parts and inner two part-circular parts within said outer parts and said inner race parts are separated from each other by a gap of 6 to 12 thousandths of an inch at each division when welded together, and said outer race parts are clamped together.

References Cited by the Examiner

UNITED STATES PATENTS

| | | | |
|---|---|---|---|
| 1,269,808 | 6/1918 | Gray et al. | 51—291 |
| 1,375,020 | 4/1921 | Sellew | 219—104 |
| 1,395,607 | 11/1921 | Sorensen | 29—148.4 X |
| 2,016,923 | 10/1935 | Herrmann | 29—148.4 X |
| 2,503,533 | 4/1950 | Williams | 29—149.5 |

JOHN F. CAMPBELL, *Primary Examiner.*

THOMAS H. EAGER, *Examiner.*